United States Patent [19]

Skinner

[11] Patent Number: 4,723,163
[45] Date of Patent: Feb. 2, 1988

[54] ADAPTIVE LINE INTERPOLATION FOR PROGRESSIVE SCAN DISPLAYS

[75] Inventor: Kenneth R. Skinner, Jefferson City, Tenn.

[73] Assignee: North American Philips Consumer Electronics Corp., New York, N.Y.

[21] Appl. No.: 813,338

[22] Filed: Dec. 26, 1985

[51] Int. Cl.⁴ .............................................. H04N 7/01
[52] U.S. Cl. ..................................... 358/140; 358/160
[58] Field of Search ................ 358/140, 11, 105, 160; 340/728

[56] References Cited

U.S. PATENT DOCUMENTS

| | | | |
|---|---|---|---|
| 4,322,750 | 3/1982 | Lord et al. | 358/140 |
| 4,484,188 | 11/1984 | Ott | 340/728 |
| 4,684,985 | 8/1987 | Nakagati et al. | 358/140 |

Primary Examiner—Howard W. Britton
Assistant Examiner—Victor R. Kostak
Attorney, Agent, or Firm—Thomas A. Briody; William J. Streeter; Marianne R. Rich

[57] ABSTRACT

An interpolated line is created between the horizontal lines of each field of an interlaced television signal on a pixel-by-pixel basis. For each pixel to be interpolated, the pixel in the same field located immediately above and below the interpolated pixel are compared. If the difference between the two values exceeds a predetermined difference, the larger or the smaller pixel value is picked for the interpolated pixel, depending upon the value of the corresponding pixel in the immediately previous field. If the difference between the two pixel values is smaller than the reference value, either of the two values or an average of the two values may be used as the interpolated pixel value.

14 Claims, 10 Drawing Figures

ADAPTIVE LINE INTERPOLATION FOR PROGRESSIVE SCAN DISPLAYS

BACKGROUND OF THE INVENTION

1. Field of the Invention

The present invention relates to television displays and the control thereof. More particularly, it relates to television displays with progressive rather than interlaced scan.

2. Description of the Prior Art

As is well known, television pictures are generally generated by interlaced scanning; i.e., for each pair of fields constituting a frame, each line of the second field is positioned in space between successive lines of the first field. This is illustrated in FIG. 1A. In this figure, as in FIGS. 1B and 1C, an edge view of the scanning lines shown, the arrows depicting light intensity. It will be noted that the interlace pattern illustrated in FIG. 1A results in interline flicker which becomes increasingly annoying as the size of the display is increased. On the other hand, in FIG. 1B a progressive scan utilizing and adjacent line averaging algorithm is illustrated. In a progressive scan, a line is interpolated between two successive scan lines within each field and horizontal scanning takes place at double the interlace scan frequency. The problem of interline flicker has been alleviated, but, as will be noted in particular where the light intensity changes from maximum to minimum, namely at the top and bottom of the lines displayed in FIG. 1B, there is smear in the vertical direction, i.e. sharp contours are destroyed. Finally, FIG. 1C illustrates a progressive scanning algorithm in which the interpolated lines are simply repeats of the previous line. It will be noted that the pattern is stretched in the vertical direction, while interline flicker is still present.

In addition, more complex and expensive methods of processing the interlace signal to create the progressive scan display are known. These require motion detection means if an acceptable picture is to result.

SUMMARY OF THE INVENTION

It is an object of the present invention to overcome the difficulties of the adjacent line averaging and repeat line methods, without requiring motion detection means.

In accordance with the present invention, progressive scan television signals are generated in response to received interlaced television signals. The progressive scan television signals have interpolated (new) lines between sequential lines in each field of the interlaced television signals. New pixel values for the new lines are derived as follows:

A first and second pixel at, respectively, a first and second location relative to the new pixel in the first television field are selected. These pixels have a first and second pixel value, respectively. A signal is generated which is indicative of the relationship between the first and second pixel value. One of the first and second pixel values is selected to constitute the new pixel value, in part in dependence on the relationship between the two pixel values.

In addition, the value of the pixel at the location corresponding to the location of the new pixel, but in the previous field, is a criterion in the selection process.

Preferably, the received pixel values and the interpolated, new pixel values are stored in line memories, both being entered at a first clock frequency. Readout from the line memories then takes place in a predetermined sequence and at a second clock frequency.

The present invention, as well as additional objects and variations thereof, will be better understood upon reference to the following description taken in connection with the accompanying drawing.

DESCRIPTION OF THE PREFERRED EMBODIMENTS

Figure 3A:
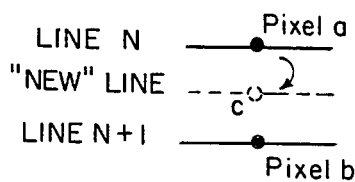
FIGS. 3A–3C are a diagram illustrating the pixel-by-pixel processing according to the present invention.
Figure 3B:
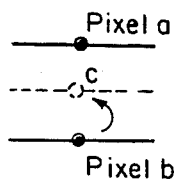
Figure 3C:
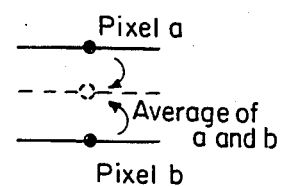

In the apparatus and method of the present invention, only information from the present interlace field is used, either directly or after processing, for generating the progressive scan display. For each pixel in the line to be interpolated (new line) the pixel value immediately above and immediately below is determined, in some cases in conjunction with information (to be described later) about the corresponding pixel in the previous field. On the basis of this information, a decision is made to do one of the following things:

1. Use pixel imformation from the line above for the "new" line, as illustrated in FIG. 3A.
2. Use the pixel value from the line below for the "new" line, as illustrated in FIG. 3B.
3. Use the average of the pixel value from the line above and the line below for the "new" line, as illustrated in FIG. 3C.

As an alternate for step 3 above, instead of using the avarage of pixel value from the line above and the line below, either one of the values could be picked for the "new" line.

Figure 4:
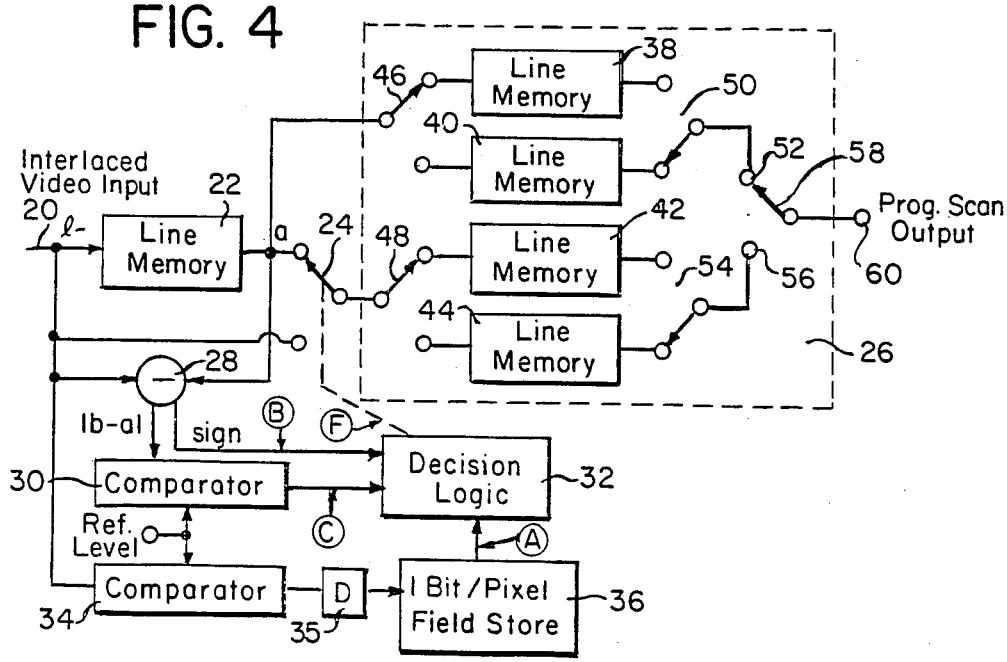
FIG. 4 is a schematic diagram illustrating the apparatus according to the present invention.

The basis for determining whether the value of the pixel above or below, or an average value is to be used will now be discussed. It should be noted that a memory or delay element is provided which makes available one bit value for each pixel in the previous field (36, FIG. 4). This one bit represents whether the previous field pixel value is above or below a first predetermined reference level. In the present field, the values of pixels A (above) and B (below) are compared, and if the difference is above or below a second predetermined reference level a decision is made according to the following algorithm:

1. For $b>a$, and $|b-a|>$Ref. Level, and previous field pixel value is$>$Ref. Level, make $c=b$
2. For $a>b$, and $|b-a|>$Ref. Level, and previous field pixel value is$>$Ref. Level, make $c=a$
3. For $b>a$, and $|b-a|>$Ref. Level, and previous field pixel value is$<$Ref. Level, make $c=a$
4. For $a>b$, and $|b-a|>$Ref. Level, and previous field pixel value is$<$Ref. Level, make $c=b$
5. For $|b-a|<$Ref. Level, make $c=(a+b)/2$ It is noted in the above that the first and second predetermined reference levels may be the same reference level (FIG. 4). Further, case 5 indicates that an average is taken of the values of pixels A and B if their difference is less than the reference level. Alternatively, as mentioned above, the value of c, the "new" value, may be made either a or b. This alternate solution simplifies the circuit implementation.

The reference level is determined empirically. It should be beneath the level where the difference between b and a is sufficiently large to cause interline flicker in a normal interlace scan display.

Figure 1A:
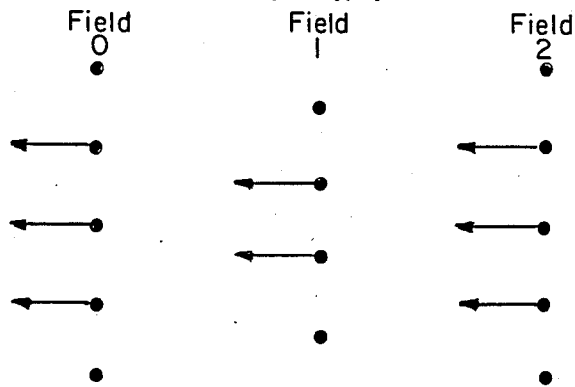
FIGS. 1A, 1B and 1C illustrate prior art methods for processing interlace television signals to create a progressive scan.
Figure 1B:
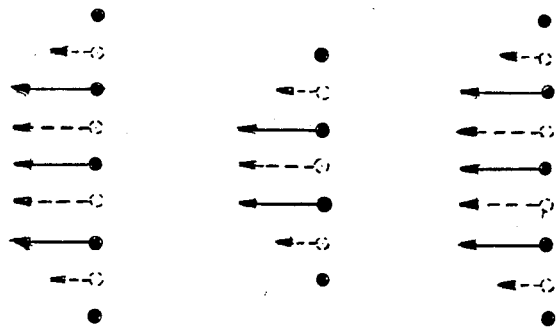
Figure 1C:
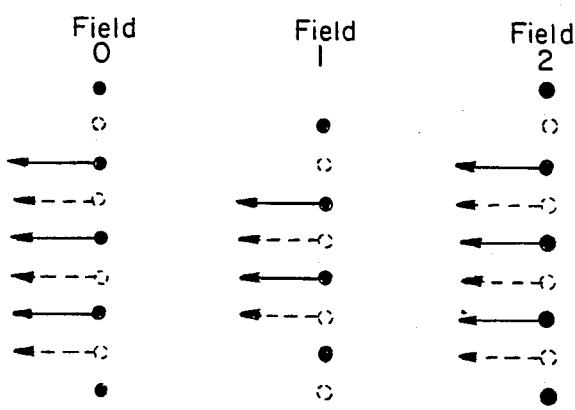
Figure 2:
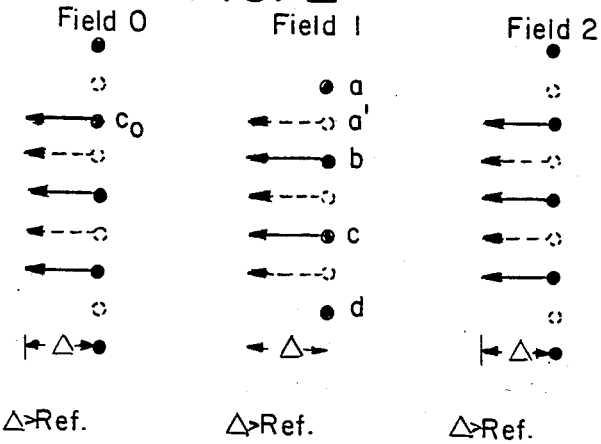
FIG. 2 is an edge view of scanning lines of sequential fields using the method of the present invention.

An edge view of the scanning lines utilizing the above algorithm is illustrated in FIG. 2. In FIG. 2, the interlace scan lines as received are shown by solid lines or black circles, while the interpolated or "new" lines are dashed lines or white circles. To illustrate, the top line pixel in field 1 has a low pixel value, while the next solid line, line b, has a high pixel value, the difference between the amplitudes of line b and line a exceeding the reference value. Under these circumstances, the pixel value of the corresponding pixel $c_0$ in field 0 is tested. Since this value exceeds the reference level, the first "new" line pixel, namely a', has a pixel value equal to that of pixel b. Next, looking at line b and line c, the difference in amplitude between these pixels is less than the reference value. The average value is thus used which, in this case, is equal to that of either b or c. Finally, looking at lines c and d, the amplitude of the difference between the two pixel values again exceeds the reference level. Since the value of the corresponding pixel in field 0 is greater than the reference level, new pixel c' takes on the same value as line c. It will be noted that the resulting pattern has no interline flicker, no stretch, and no vertical smear.

The truth table below implements the algorithm described above. In the truth table:

A = value of previous field's pixel level, 1 if above reference level, 0 if below.

B = sign of the present field's pixel level transition between line above and line below, 1 signifying +, 0 signifying −.

C = magnitude of present field's pixel transition between line above and line below, 1 if above, 0 if below a reference level.

F = choice of upper or lower line pixel value, 1 for upper, 0 for lower.

| A | B | C | F |
|---|---|---|---|
| 1 | 1 | 1 | 1 |
| 0 | 0 | 1 | 1 |
| 0 | 1 | 1 | 0 |
| 1 | 0 | 1 | 0 |
| 1 | 1 or 0 | 0 | 1 or 0 |
| 0 | 1 or 0 | 0 | 1 or 0 |

The last two entries in the truth table represent don't care conditions; wherein, whenever C=0 the output can be either 1 or 0.

Thus: $F = ABC + \overline{AB}C$

Figure 5:
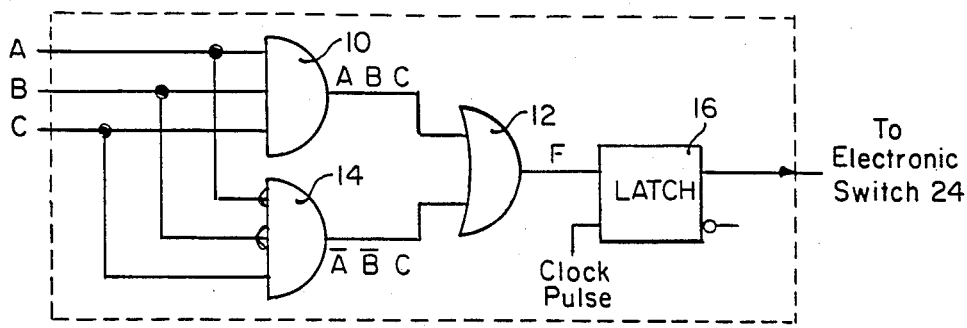
FIG. 5 is a schematic diagram of the decision logic block of FIG. 4.

This is implemented in the decision block illustrated in FIG. 5. In FIG. 5, reference numeral 10 refers to an AND gate having inputs A, B and C. Its output, namely ABC is applied to the first input of an OR gate 12. The second input of OR gate 12 is applied to the output of an AND gate 14. AND gate 14 has three inputs, namely $\overline{A}$, $\overline{B}$, C. The output of OR gate 12 is the signal F. This, in turn, is applied to a latch 16 which is clocked by clock pulses as will now be explained with reference to FIG. 4.

The apparatus implementing the adaptive line interpolation filter of the present invention is shown in FIG. 4. It must be kept in mind that the interlaced video input signal is assumed to have a line frequency $f_H$, while the progressive scan output operates at a frequency $2f_H$ since the progressive line display includes twice the number of lines in each field.

Referring now to FIG. 4, the interlaced video input signal is applied at a terminal 20. Terminal 20 is connected to a one line memory 22 whose output is connected to a first terminal of a selector switch 24, a first input of a scan converter 26 and the first input of a difference circuit 28. The second input of difference circuit 28 and a second terminal of selector switch 24 are also connected to input 20. Difference circuit 28 has two outputs, the first signifying the sign of the difference between the signals applied to the first and second inputs, the second corresponding to the magnitude of this difference. The output signifying the magnitude of the differences is applied to one input of a comparator 30 whose second input receives a reference level signal. The output signifying the sign of the differences is applied to the first input of a decision logic circuit 32, whose second input receives the output of comparator 30. The output of decision logic 32 controls the position of the selector arm of selector switch 24 as indicated by dashed lines F. Selector arm 24 is connected to the second input of scan converter 26.

Terminal 20 is further connected to a comparator 34 whose second input also receives the reference level signal. The output of comparator 34 is connected through a half line delay 35 to a one bit per pixel field store 36 which exhibits a delay time equal to 262.5 TV lines for the NTSC standard. The output of field store 36 is connected to decision logic 32.

Scan converter 26 includes four one-line memories 38, 40, 42 and 44. The first input of scan converter 26 is connected to the common terminal of a selector switch 46 whose selector arm alternately connects the input of line memory 38 and that of line memory 40 to the output of line memory 22. A second input of scan converter 26 is connected alternately to line memory 42 and line memory 44 in synchronism with the movement of the selector arm of switch 46 by a selector switch 48.

The outputs of line memories 38 and 40 are connected through a selector switch 50 to a first scan terminal 52, while the outputs of line memories 42 and 44 are connected through a selector switch 54 to a second scan output terminal 56. The signals at terminals 56 and 52 are read out alternately at twice the line frequency by means of a selector switch 58 whose common terminal forms the output 60 of scan converter 26.

The operation of the above-described apparatus will now be explained with reference also to FIG. 6.

The interlaced video input signal is applied at terminal 20. It therefore appears delayed by one line at the output of line memory 22. This is pictured in the top two lines in FIG. 6. The direct signal as well as the delayed signal are applied to difference circuit 28, where both the sign and the magnitude of the difference are determined. The reference level to which comparator 30 is set and which, in a preferred embodiment, is the same reference level as applied to comparator 34, depends upon the level which causes interline flicker in a normal interlaced display. At the same time, the pixel values constituting the first line are applied serially to comparator 34. When a value is larger than the reference level, a "1" is stored in the corresponding location in field 36; when a value is less than the reference level, a "0" is stored. It should be noted that delay 35 causes the storing of a particular pixel to be delayed by half a line interval in addition to the standard field delay interval. This allows for the time the previous field pixel bit value is required as an input for decision logic 32.

Switch 24 is responsive to the output of decision logic 32. Its maximum switching rate is therefore the pixel sample rate. Reference to FIG. 6 shows that switches 46 and 48 are operated in synchronism. Let it be assumed that the equipment is operating in the second line interval, i.e. line B is coming in. As illustrated in line 4 of FIG. 6, switches 46 and 48 are in the down position throughout this whole line interval, so that the information from line B is stored in line memory 40, while the data for the interpolated line immediately to follow line B is being stored in line memory 44.

At the same time, switches 50 and 54 are in the up position, so that read out is taking place from line memories 38 and 42. The data stored therein would correspond to the data of line A and of the interpolated line to follow line A, respectively. Switch 58 is switched in synchronism with the above-mentioned switches, but at twice the rate. (FIG. 6, Line 5). Line memory 38 is thus being read during the initial half of the write time interval, while the interpolated data from line memory 42 is read out during the remaining half. (Lines 8 and 9).

For the third line interval the same operation repeats except that the position of the switches is now that shown in FIG. 4. In other words, in each input line interval, data of a delayed line is stored in either line memory 38 or line memory 40, while interpolated data which is to follow this line is stored in line memories 42 and 44, respectively. Read-out of the line memories takes place at twice the line frequency from those memories not then receiving data and at twice the write frequency.

Figure 6:
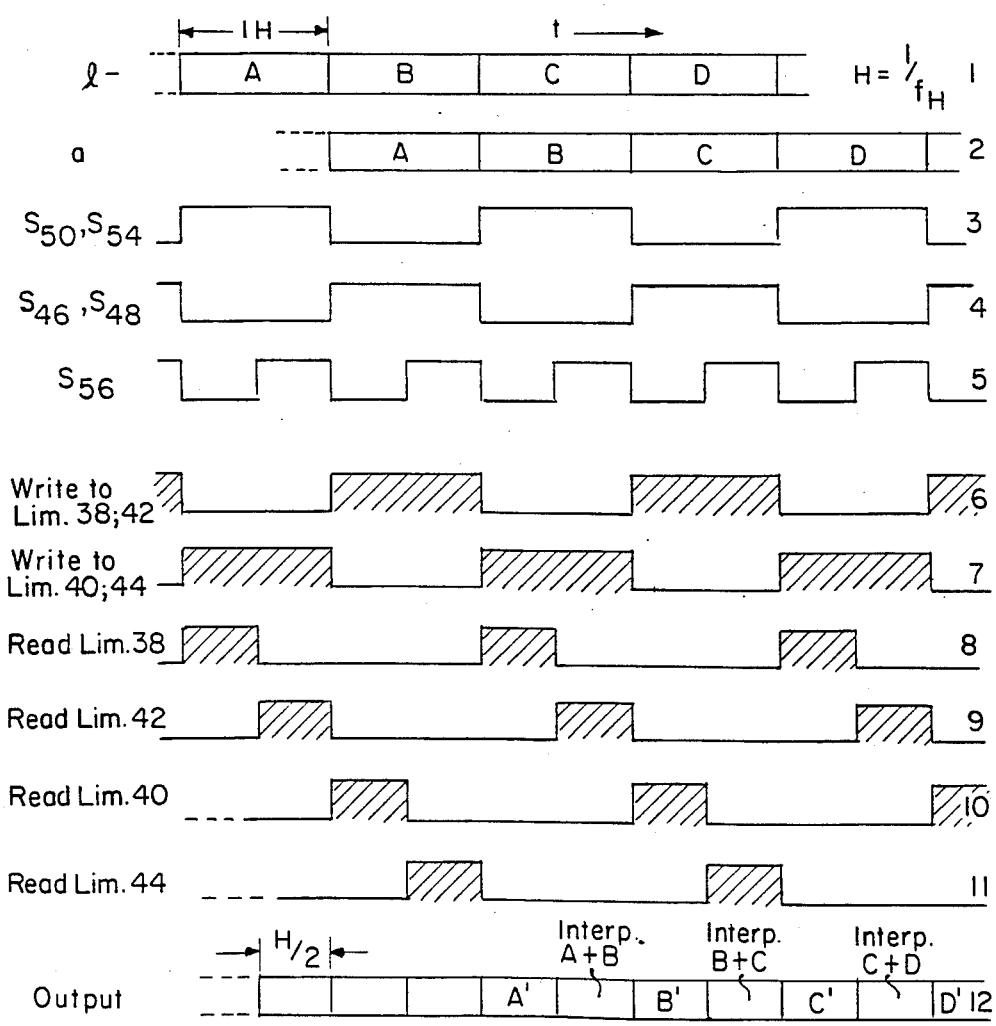
FIG. 6 is a timing diagram illustrating the operation of the apparatus of FIG. 4.

The resulting output at terminal 60 is illustrated in line 12 of FIG. 6. It will be noted that compressed line data alternates with similarly compressed interpolated data. The output at terminal 60 after suitable processing is used to drive the display. The latter, as a result, has twice the number of lines per field as does the standard interlaced display.

It is thus evident that with the particularly simple method and apparatus of the present invention, it is possible to obtain a television picture in which interline flicker and vertical smear are eliminated. Further, no motion detection circuitry is required, since all the data used is from the present field, previous field data being used only to determine whether data from a subsequent or a previous line is to be used for the interpolated line.

Although the invention has been illustrated in particular preferred embodiments, it is not intended to be limited thereto. Many variations in operation and construction will readily occur to one skilled in the art and are intended to encompassed in the invention as set forth in the following claims.

I claim:

1. Method for generating a new pixel value for a new pixel in a new television line to be interpolated between a first and second line of a first television field interlaced with an immediately preceding second television field, comprising the steps of:

selecting a first and second pixel at, respectively, a first and second location relative to said new pixel in said first television field, said first and second pixel having, respectively, a first and second pixel value;

combining said first and second pixel value and generating a first signal indicative of the relationship therebetween; and selecting one of said first and second pixel values to constitute said new pixel value, at least in part in dependence on said first signal.

2. Method as set forth in claim 1, wherein said first and second pixels are, respectively, the pixel directly above and the pixel directly below said new pixel in said first television field.

3. A method as set forth in claim 2, wherein said step of combining said first and said second pixel value comprises the step of subtracting said first from said second pixel value, said first signal constituting a difference signal, said difference signal having a first difference value when said difference between said first and second pixel values exceeds a predetermined difference and a second difference value when said difference between said first and second pixel values is less than said predetermined difference.

4. A method as set forth in claim 3 further comprising the step of generating a stored value indicative of the value of a correspondingly located pixel in said second television field; and wherein said selecting step comprises selecting said first or second pixel value to constitute said new pixel value at least in part in dependence upon said stored value.

5. A method as set forth in claim 4, wherein said step of generating said stored value comprises the step of comparing said pixel value of said correspondingly located pixel to a predetermined reference value and generating a first or a second stored value when said corresponding pixel value is, respectively, at least equal to or less than said predetermined reference value.

6. A method as set forth in claim 5, wherein said selecting step comprises the step of selecting the larger of said first and second pixel values to constitute said new pixel value in response to simultaneous presence of said first stored value and said first difference value.

7. A method as set forth in claim 5, wherein said selecting step comprises selecting the smaller of said first and second pixel values when said difference signal has said first difference value and said stored value is said second stored value.

8. Apparatus for generating progressive scan television signals in response to received interlaced television signals having a first field interlaced with an immediately preceding second field, said progressive scan television signals having interpolated lines between sequential lines in said first field of said interlaced television signals, comprising:

receiving means for receiving said interlaced television signals including horizontal line data;

first memory means for storing previous field pixel value data indicative of pixel values in said second field;

decision logic means connected to said receiving means for generating interpolation data from said received line data at least in part under control of said previous field pixel value data;

a plurality of line memory means;

means for writing said received line data into first selected ones of said plurality of line memories and said interpolation data into second selected ones of said plurality of line memories, at a first clock frequency; and means for reading out line and interpolation data from said plurality of line memory means in a predetermined sequence and at a second clock frequency.

9. Apparatus as claimed in claim 8 further comprising delay means connected to said receiving means for delaying said received line data by a one line interval thereby creating delayed line data, means connected to said receiving means and said delay means for creating a difference signal signifying the difference between said delayed line data and said received line data, and means applying said difference signal to said decision logic means, whereby said decision logic means operates under control of said previous field pixel value data and said difference signal.

10. Apparatus as claimed in claim 9, wherein said difference signal comprises a magnitude signal indicative of the magnitude of the difference between said delayed line data and said received line data, and a sign signal signifying the sign of said difference.

11. Apparatus as claimed in claim 10, wherein said plurality of line memories comprises a first, second, third and fourth line memory;

and wherein said writing means comprises means for connecting said delay means alternately to said first and second line memories, at said first predetermined horizontal line frequency, and means interconnected between said third and fourth line memory means, said delay means and said receiving means for selectively applying said delayed line data or said received line data to said third or fourth line memory means at least in part under control of said decision logic means.

12. Apparatus as claimed in claim 11, wherein said writing means comprises line memory selector means for selecting said third or said fourth line memory means alternately in synchronism with writing of said delayed line data into said first or said second line memory means, respectively, and means connected to said line memory selector means, said receiving means and said delay means for selectively applying delayed line data or received line data to said line memory selector means under control of said decision logic means.

13. Apparatus for generating a new pixel value for a new pixel in a new television line to be interpolated between a first and second line of a first television field having an immediately preceding second television field, comprising means for generating a first signal indicative of the relationship of the value of a first pixel in said first field and the value of a second pixel in said first field;

means for generating a second signal indicative of the value of a pixel in said second field in a location corresponding to the location of said new pixel; and means for selecting one of said first pixel value and said second pixel value to constitute said new pixel value, in dependence on said first and second signals.

14. Apparatus as set forth in claim 13, wherein said first and second pixels are, respectively, the pixel directly above and the pixel directly below said new pixel in said first television field.

* * * * *